(12) United States Patent
Cox et al.

(10) Patent No.: US 7,698,852 B1
(45) Date of Patent: Apr. 20, 2010

(54) FISHING LURE

(75) Inventors: Clifford W. Cox, Dallas, TX (US); J. Clifton Gibson, Watauga, TX (US)

(73) Assignee: Slick Fish Lure, Inc., Dallas, TX (US)

( * ) Notice: Subject to any disclaimer, the term of this patent is extended or adjusted under 35 U.S.C. 154(b) by 510 days.

(21) Appl. No.: 11/647,678

(22) Filed: Dec. 29, 2006

Related U.S. Application Data

(60) Provisional application No. 60/755,641, filed on Dec. 30, 2005.

(51) Int. Cl.
*A01K 83/02* (2006.01)
*A01K 85/02* (2006.01)

(52) U.S. Cl. .............................................. 43/37; 43/35

(58) Field of Classification Search ................ 43/34–37
See application file for complete search history.

(56) References Cited

U.S. PATENT DOCUMENTS

| | | | | |
|---|---|---|---|---|
| 151,394 | A * | 5/1874 | Huard et al. ................... | 43/35 |
| 627,344 | A * | 6/1899 | Maroney ........................ | 43/35 |
| 635,547 | A * | 10/1899 | Howard .......................... | 43/35 |
| 922,879 | A * | 5/1909 | Gabrielson .................... | 43/36 |
| 1,209,237 | A * | 12/1916 | Warren .......................... | 43/35 |
| 1,242,469 | A * | 10/1917 | Penrod .......................... | 43/37 |
| 1,268,097 | A * | 6/1918 | Crandall ........................ | 43/35 |
| 1,454,689 | A * | 5/1923 | Quintal .......................... | 43/37 |
| 1,459,042 | A * | 6/1923 | Wrege ............................ | 43/35 |
| 1,701,643 | A * | 2/1929 | Stoll .............................. | 43/35 |
| 2,044,702 | A * | 6/1936 | Kalyu ............................ | 43/35 |
| 2,079,509 | A * | 5/1937 | Kettring ......................... | 43/35 |
| 2,149,923 | A * | 3/1939 | Martin ........................... | 43/34 |
| 2,244,980 | A * | 6/1941 | Abramson ..................... | 43/35 |
| 2,295,042 | A * | 9/1942 | Llewellyn ...................... | 43/35 |
| 2,439,391 | A * | 4/1948 | Jobson .......................... | 43/35 |
| 2,571,222 | A * | 10/1951 | Dyer .............................. | 43/35 |
| 2,590,752 | A * | 3/1952 | Chaffee ......................... | 43/37 |
| 2,605,571 | A * | 8/1952 | Fasano et al. .................. | 43/36 |
| 2,613,469 | A * | 10/1952 | Haberkorn ..................... | 43/35 |
| 2,619,756 | A * | 12/1952 | Hunicke et al. ................ | 43/35 |
| 2,643,479 | A * | 6/1953 | Stevenson ..................... | 43/36 |
| 2,727,329 | A * | 12/1955 | Robinson ....................... | 43/35 |
| 2,768,463 | A * | 10/1956 | Spence .......................... | 43/36 |

(Continued)

FOREIGN PATENT DOCUMENTS

JP     2002084927 A  *  3/2002

(Continued)

*Primary Examiner*—Darren W Ark
(74) *Attorney, Agent, or Firm*—Bracewell & Giuliani LLP

(57) ABSTRACT

A fishing lure has retractable hooks. A spring has a coiled portion mounted around a pin in the lure body, two energizing leg extending from the coiled portion, and a foot extending laterally from each energizing leg. The feet engage a rearward side of the shank of each hook. A trigger has a rod on a forward end that extends from the body for attachment to a line. The trigger has a trigger body that engages a forward side of each of the shanks. The trigger and the lure body have mating detent surfaces to releasably retain the hooks in a cocked position. A forward pull on the rod releases the trigger to move forward, freeing the coiled portion of the spring to unwind, causing the energizing legs to rotate the hooks to the extended position.

17 Claims, 3 Drawing Sheets

U.S. PATENT DOCUMENTS

| | | | |
|---|---|---|---|
| 2,854,778 A * | 10/1958 | Polki | 43/35 |
| 3,059,371 A * | 10/1962 | Haynie, Sr. | 43/35 |
| 3,081,572 A * | 3/1963 | Tomsello | 43/35 |
| 3,175,322 A * | 3/1965 | Snyder | 43/36 |
| 3,337,980 A * | 8/1967 | Farajian et al. | 43/35 |
| 3,646,699 A * | 3/1972 | Zeman | 43/35 |
| 3,803,748 A * | 4/1974 | Neal | 43/36 |
| 3,981,094 A * | 9/1976 | Leffel | 43/35 |
| 4,135,323 A * | 1/1979 | Esten | 43/42.16 |
| 4,176,489 A * | 12/1979 | Levstik | 43/35 |
| 4,446,647 A * | 5/1984 | Kahl | 43/36 |
| 4,528,770 A * | 7/1985 | McDiarmid | 43/35 |
| 4,562,661 A * | 1/1986 | Messinger et al. | 43/35 |
| 4,640,042 A * | 2/1987 | Rowe | 43/42.15 |
| 4,841,665 A * | 6/1989 | McGahee | 43/42.24 |
| 5,440,830 A * | 8/1995 | Smith | 43/37 |
| 5,491,925 A * | 2/1996 | Carpenter | 43/37 |
| 5,526,602 A * | 6/1996 | Day, Sr. | 43/37 |
| 5,809,685 A * | 9/1998 | Mauldin | 43/35 |
| 5,822,911 A * | 10/1998 | Cox | 43/37 |
| 6,044,583 A * | 4/2000 | Hay | 43/42.19 |
| 6,931,783 B1 * | 8/2005 | Faulkner | 43/35 |
| 7,254,916 B2 * | 8/2007 | Mussot | 43/35 |
| 2004/0134118 A1 * | 7/2004 | Miller et al. | 43/34 |

FOREIGN PATENT DOCUMENTS

JP 2006109824 A * 4/2006

* cited by examiner

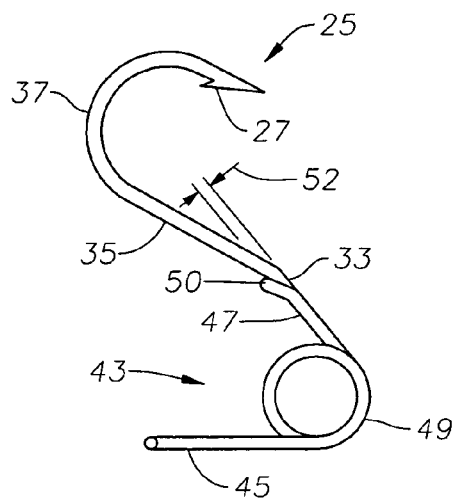
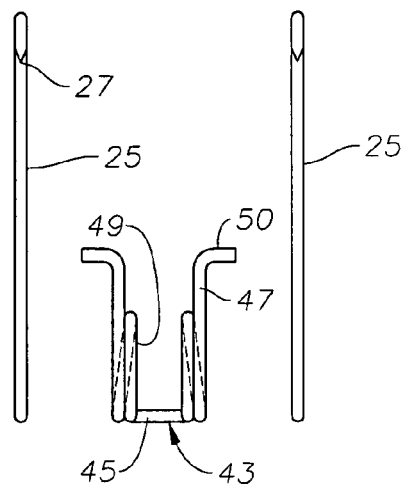
Fig. 6    Fig. 7
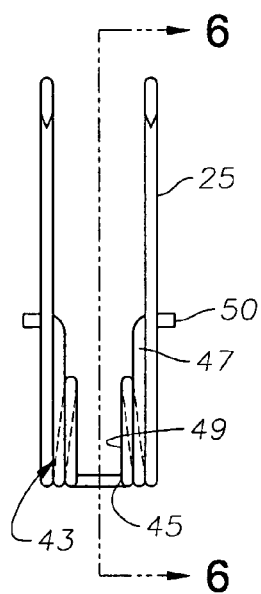
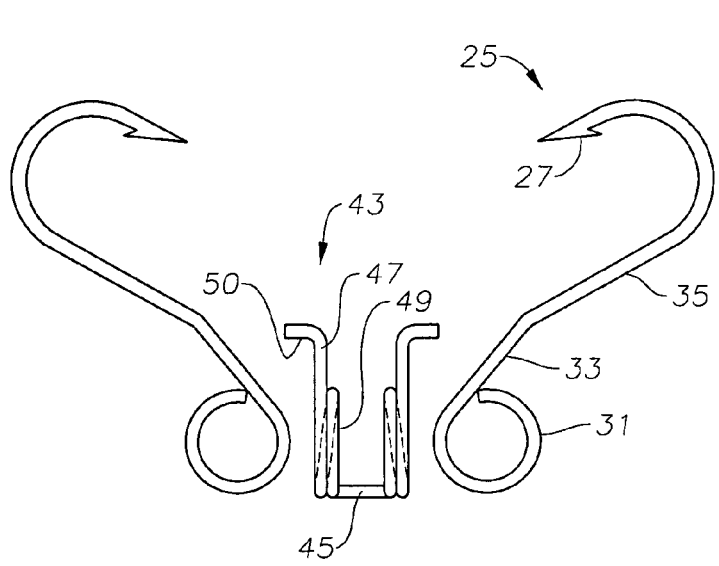
Fig. 8    Fig. 9

ND. US 7,698,852 B1

FISHING LURE

CROSS-REFERENCE TO RELATED APPLICATION

This application claims priority to provisional application 60/755,641, filed Dec. 30, 2005.

FIELD OF THE INVENTION

This invention relates to fishing lures, and in particular to fishing lures having spring-loaded hooks which are retained within the body of the lure until released by a trigger mechanism.

BACKGROUND OF THE INVENTION

Fishing by casting artificial lures is widespread pastime. The lures come in many shapes, colors and sizes. One or more barbed hooks will be attached to the lure body. Some lures are designed for returning on the surface of the water and others for being submerged.

Snagging the hook of a lure on weeds or other submerged objects has been a longstanding problem. Often, the fisherman is unable to free the lure simply by pulling on the line. In many cases the lure will be lost.

Lures with retractable hooks are known in the patented art. The hooks rotate from an exposed position to a cocked position with the barbs recessed within the body. Some type of bias means urges the hooks toward the exposed position, and a detent device retains the hooks in the cocked position. When the lure is grabbed by a fish, the detent frees the hooks to rotate to the exposed position. Although the various types appear to be workable, improvements are desired.

SUMMARY

The fishing lure of this invention has a spring separate from the hook. The spring has a coiled portion, an energizing leg extending from the coiled portion, and a foot extending laterally from the energizing leg. The hook has a shank engaged by the foot of the spring. A trigger engages a forward side of the shank and when pushed rearward, the trigger pushes against the shank to rotate the hook to a cocked or recessed position. Mating detents on the trigger and in the lure body releasably retain the hook in the cocked position. A forward pull on the trigger by a fish grabbing the lure releases the trigger to move forward, freeing the coiled portion of the spring to unwind, and causing the energizing leg to rotate the hook to the extended position.

In the preferred embodiment, the foot is offset in a rearward direction a slight amount from the energizing leg. The offset allows the shank of the hook to be parallel with the energizing leg while in the cocked position. The trigger thus simultaneously engages both the shank of the hook and the energizing leg, avoiding bending the shank of the hook. Preferably, the hook does not undergo bending when moved between the cocked and exposed positions.

The trigger preferably has a detent surface that inclines relative to the axis of the lure body. The detent surface is preferably spaced forward from the rearward end of the trigger by a ramp surface that inclines in an opposite direction from the trigger detent surface. In the preferred embodiment, the end of the trigger has a shank engaging surface that slopes at an angle selected to be flush with the shank while in the released position.

BRIEF DESCRIPTION OF THE DRAWINGS

FIG. 6 is a side elevational view of the spring mechanism and the hooks of the fishing lure of FIG. 1, shown removed from the lure body.

FIG. 7 is an exploded plan view of the spring mechanism and the hooks of FIG. 6.

FIG. 8 is a view similar to FIG. 7, but with the hooks assembled with the spring.

FIG. 9 is an exploded plan view similar to FIG. 7, but showing the hooks rotated into a side view.

DETAILED DESCRIPTION OF THE PREFERRED EMBODIMENT

Figure 1:
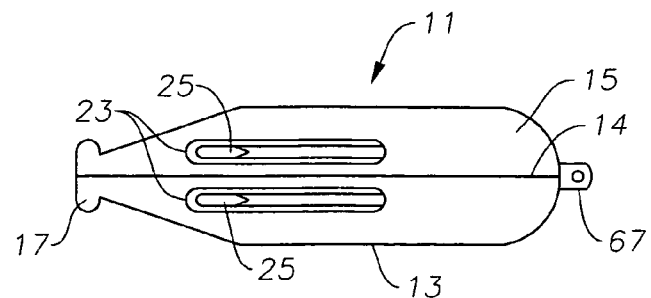
FIG. 1 is a plan view of a fishing lure constructed in accordance with the present invention, showing the hooks recessed within slots.
Figure 2:
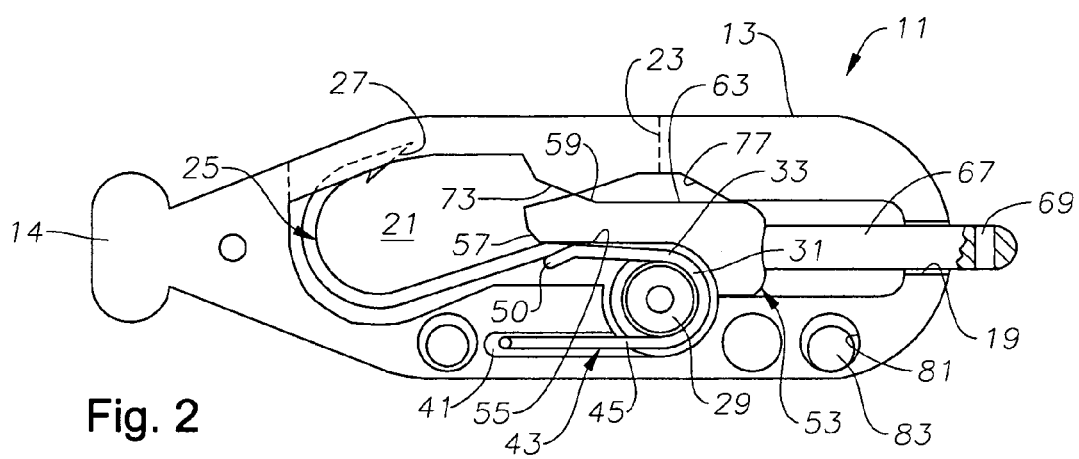
FIG. 2 is a side elevational view of one of the two halves of the lure body of FIG. 1, and showing the hooks recessed within the slots and the trigger in a cocked position.
Figure 3:
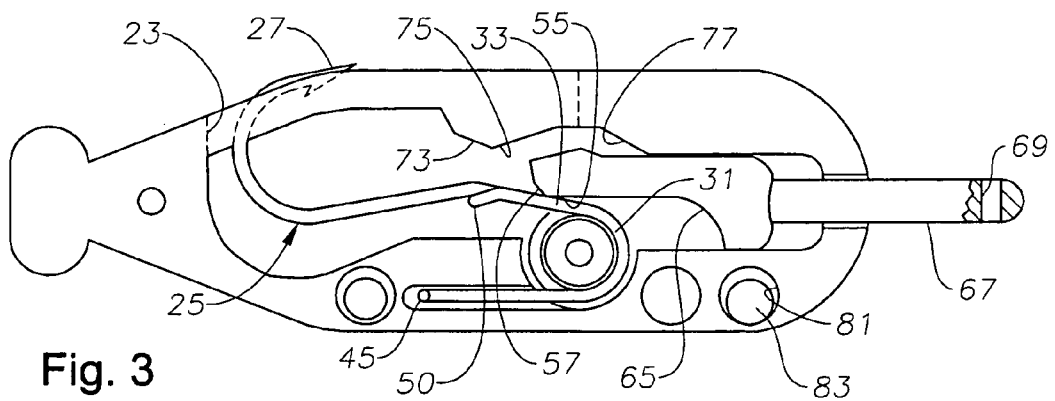
FIG. 3 is a side elevational view similar to FIG. 2, showing the trigger in the process of being moved to the forward position and the hooks being rotated to an exposed position.
Figure 4:
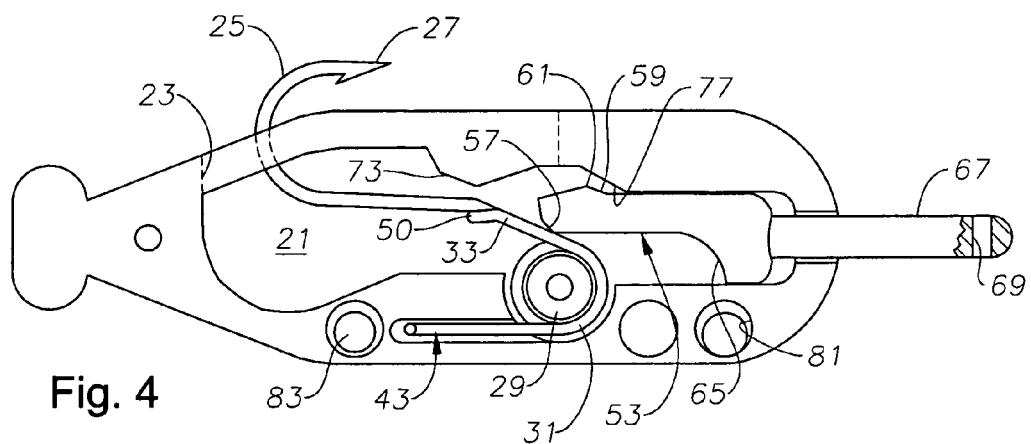
FIG. 4 is a side elevational view similar to FIG. 3, showing the trigger being moved further toward the forward position and the hooks being rotated further toward the exposed position.

Referring to FIG. 1, a fishing lure 11 is shown fully assembled. Fishing lure 11 includes a body 13 having a head end 15 and a tail end 17. In the preferred embodiment, body 13 is torpedo-shaped. Body 13 has a longitudinal axis that extends through an opening 19 (FIG. 2) on its forward or head end 15. In the preferred embodiment, body 13 is molded in two halves, each having an inner side 14 that abuts and is joined to the other, such as by sonic welding, when assembled.

Referring to FIGS. 2-5, fishing lure 11 includes a hollow cavity 21 located within body 13. A pair of elongated slots 23 leads from cavity 21 to one side, shown to be the upper side of body 13. Forward opening 19 also communicates with cavity 21. At least one hook 25, and preferably two, is housed within cavity 21 of body 13. As shown in more detail in FIGS. 6-9, each hook 25 has a curved portion with a barb 27 on one end. As is readily understood by those skilled in the art, barb 27 allows hook 25 to remain in a fish after hook 25 has been set. Referring back to FIGS. 2-5, each hook 25 has a circular mounting loop 31 on its opposite end that wraps around a mounting pin 29 located within cavity 21. Pin 29 is stationary in body 13, and mounting loop 31 rotates on pin 29 to pivotally secure hook 25 within body 13. In the preferred embodiment, pin 29 is cylindrical in shape and extends perpendicular to the longitudinal axis of body 13.

Hook 25 also preferably includes a substantially straight shank 33 that extends from mounting loop 31 on a tangent line of pin 29. In the preferred embodiment, shank 33 is the portion of hook 25 that engages the triggering mechanism of fishing lure 11. Hook 25 also preferably includes an angled region 35 (FIG. 6) extending away from shank 33. In the embodiment shown in FIGS. 1-9, angled region 35 extends away from engagement region at approximately 23 degrees. In the preferred embodiment, angled region 35 extends away between 15 and 30 degrees from shank 33. Angled region 35 is straight and joins the curved portion of hook 25 to shank 33.

Figure 5:
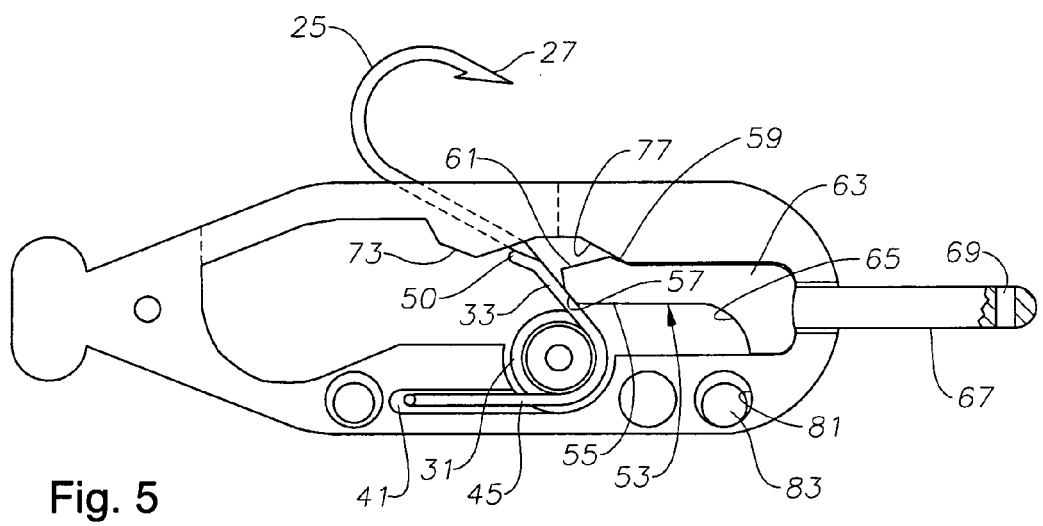
FIG. 5 is a side elevational view similar to FIG. 4, showing the trigger in the forward position and the hooks in the exposed position

Hooks 25 are movable from a cocked or recessed position shown in FIG. 1 to a released or exposed position shown in FIG. 5. In the cocked position, barbs 27 are recessed within slots 23, and in the exposed position, barbs 27 are exterior of body 13. In the preferred embodiment, hooks 25 are made from a standard material generally associated with fish hooks, which is steel, but not resilient steel such as used in springs.

Referring back to FIGS. 2-5, cavity 21 also includes a spring base section 41 located opposite slots 23. Spring base section 41 is preferably an elongated chamber for receiving a portion of a coiled spring 43, which is located between the two hooks 25. As best shown in FIGS. 6-9, coiled spring 43 includes a pair of coiled sections 49 with a central loop 45 extending between them. Central loop 45 extends rearward from coiled sections 49 and fits within spring base chamber 41, serving as a stationary end or leg of coiled section 49. In the preferred embodiment, each coiled section 49 slides over pin 29 and is prevented from rotating relative to pin 29 by the contact of central loop 45 with spring base section 41.

Each coiled section 49 has an energizing leg 47 extending therefrom along a tangent line from coiled section 49. Energizing legs 47 can be rotated in one direction relative to coiled section 49 to increase the energy stored in coiled section 49, and when released, the coiled section energy will rotate hooks 25 to the exposed position.

A foot 50 extends laterally outward from each energizing leg 47 for engaging a rearward side of the shank 33 of one of the hooks 25. Each foot 50 is bent into a configuration that places it rearward from its energizing leg 47 by the offset dimension 52 (FIG. 6). Dimension 52 is substantially equal to the diameter of hook shank 33, and the diameter of spring energizing leg 47 is substantially the same diameter as hook shank 33. Stated another way, a tangent line drawn from pin 29 to foot 50 would be at an angle relative to energizing leg 47. As a result, the centerlines of hook shank 33 and spring energizing leg 47 are located in the same plane.

As best shown in FIGS. 6 and 8, foot 50 of spring energizing leg 47 engages shank 33 of hook 25 such that spring energizing leg 47 biases hook 25 to the released or exposed position, which is upward and through slot 23 away from cavity 21. In the preferred embodiment, spring energizing leg 47 is at an angle relative to spring central loop 45. In the embodiment shown in FIGS. 1-9, the angle between spring energizing leg 47 and spring central loop 45 is approximately 55 degrees when spring 43 is in its relaxed or extended state shown in FIGS. 5 and 6. When hook 25 is positioned in its cocked or recessed position shown in FIG. 2, coil spring 43 is further wound such that spring central loop 45 and spring energizing leg 47 extend on substantially parallel planes. In the preferred embodiment, coiled spring 43 is made from spring steel that has a high tensile strength and is resilient to perform the spring functions of coiled spring 43.

Fishing lure 11 preferably includes a trigger 53 that moves linearly within cavity 21 along the longitudinal axis between forward and rearward positions. Trigger 53 has an engagement surface 55 that simultaneously engages shank 33 and energizing leg 47. Engagement surface 55 is located on the surface opposite trigger 53 from slots 23. Engagement surface 55 preferably includes an inclined face 57 located on a rearward end of trigger 53. Inclined face 57 slopes upward from its forward edge to its rearward edge at the end of trigger 53. The term "upward" is used for convenience to mean a direction away from the longitudinal axis. Inclined face 57 slopes at an angle such that it is flush with shank 33 of hook 25 when hook 25 is in its extended position as shown in FIG. 5. Trigger 53 also preferably includes a detent or friction surface 59 located opposite engagement surface 55 for engaging an interior surface of body 13 defining cavity 21. Friction surface 59 slopes downward in a forward direction from its rearward end to its forward end. A ramp surface 61 extends from the rearward end of trigger 53 to the rearward end of friction surface 59. Ramp surface 61 slopes upward in a forward direction from the end of trigger 53 to the junction with friction surface 59. The angle of the slope of ramp surface 61 relative to the axis is less than the slope of friction surface 59.

Trigger friction surface 59 and ramp surface 61 are located on a trigger body 63. Body 63 has a width selected so that its rearward end simultaneously engages shanks 33 of both hooks 25 and both energizing legs 47. When trigger 53 is positioned with trigger body 63 in the position shown in FIG. 2, trigger 53 is in its cocked position. The release of trigger 53 causes energizing legs 47 of coiled spring 43 to force trigger 53 axially forward such that hooks 25 can extend through elongated slots 23. Trigger 53 also preferably includes a trigger spring contour 65 located adjacent engagement surface 55. Trigger spring contour 65 is formed to receive the outer circumference of coiled section 49 of coiled spring 43 when trigger 53 is in its cocked position shown in FIG. 2. Trigger 53 also includes a cylindrical trigger rod 67 extending from trigger body 63 on the longitudinal axis through forward opening 19. Trigger rod 67 preferably includes a fishing line hole 69 for receiving a fishing line from a fishing rod. The fishing line can be secured to trigger rod 67 through fishing line hole 69 in a manner known by those skilled in the art.

Body 13 preferably includes a detent surface 73 defining an upper portion of cavity 21. Detent surface 73 is faces generally rearward to frictionally engage friction surface 59 of trigger 53 when in its cocked position. Detent surface 73 slopes downward from its rearward end to its forward end. A relief surface 75 forms an apex with detent surface 73 and extends forward to a landing shoulder 77. Relief surface slopes upward from the apex to landing shoulder 77. The apex between detent surface 73 and relief surface 75 is spaced slightly closer to longitudinal axis than the apex between trigger friction surface 59 and ramp surface 61, so that it has interference. When trigger 53 is pushed rearward, the apex between trigger friction surface 59 and ramp surface 61 snaps past the apex between detent surface 73 and relief surface 75. When the rearward force is then removed, friction surface 59 frictionally engages detent surface 73 to hold trigger 53 in the cocked position.

Landing shoulder 77 slopes downward from its rearward end to its forward end at substantially the same angle as trigger friction surface 59. In the released position (FIG. 5), trigger friction surface 59 engages landing shoulder 77, which acts as a stop to prevent further forward movement of trigger 53 after being actuated by coiled spring 43. Coiled spring 43 is preferably need not completely unwound to its natural state while trigger 43 is in the released position, rather a slight forward bias against hooks 25 still exists.

Preferably, at least portions of trigger body 63 contain an impregnated lubricant to reduce sliding friction. These portions may include engagement surface 55, inclined face 57 and ramp surface 61. The coatings on these areas are applied in a conventional manner.

Each half of lure body 13 has one or more recesses or pockets 81 formed therein offset from the longitudinal axis. In this embodiment, pockets 81 are located below the axis. Weights 83 may be placed in one or more of the pockets 81. When the halves of body 13 are placed in contact with each other, each pocket 81 defines a closed chamber to retain the weights 83. Weights 83 reduce the tendency for body 13 to spin about the longitudinal axis. If more buoyancy is desired, weights 83 may be left out of some of the pockets 81. When the halves of body 13 are assembled, pockets 81 form sealed buoyancy chambers.

In operation, a fisherman attaches fishing lure 11 to a fishing line by tying a fishing line to trigger rod 67 after inserting the fishing line through fishing line hole 69. Once the fishing line is tied to trigger rod 67 through fishing line hole 69, the user can place fishing lure 11 into its cocked position shown in FIG. 2 by pushing trigger rod 67 rearward. As trigger rod 67 is pushed rearward, trigger body 63 slides axially with inclined face 57 and engagement surface 55 pressing against shanks 33 of hooks 25 and energizing legs 47 of coiled spring 43. The rearward movement causes energizing leg 47 of coiled spring 43 to rotate counterclockwise when viewed as shown in the Figures, further winding coiled portion 49 of spring 43 to store energy. Trigger frictional surface 59 will snap past the apex formed between detent surface 73 and relief surface 75. The fisherman then releases the force on trigger rod 67, and friction surface 59 will slide into frictional engagement with housing detent surface 73 to retain trigger 53 in the rearward position. With trigger 53 cocked, hooks 25 are in the retracted position shown in FIG. 2.

The frictional resistance due to the engagement of friction surface 59 and detent surface 73 is enough to resist forward movement of trigger 53 due to general casting of fishing lure 11 while tied off to a fishing line. In the preferred embodiment, the frictional forces associated with the engagement of friction surface 59 and detent surface 73 is also strong enough to keep trigger 53 in its cocked position while fishing lure 11 is being reeled back by a fishing line through the water and through underwater foliage. When a fish "hits" or bites fishing lure 11 such that the fish's mouth surrounds body 13 and the fish's mouth encloses around head end 15, fishing lure 11 will experience rearward forces due to the fish pulling against the fishing line tied off to trigger rod 67. The rearward forces associated with a fish biting fishing lure 11 are sufficient to break the frictional forces between friction surface 59 and detent surface 73. When the frictional forces are overcome, energizing leg 47 of spring 43 rotates clockwise to force hook barbs 27 through elongated slots 23 into the extended position of hooks 25. Barbs 27 of hooks 25 advantageously penetrate the interior surface of the fish that is biting fishing lure 11 so that the fish is thereby hooked and ready to be reeled in.

As will be readily appreciated by those skilled in the art, tail 17 of body 13 is formed in such a manner that a variety of flowing streamers of tails can be connected thereto. Fishing lure 11 advantageously utilizes retractable hooks and a moveable trigger for an increased measure of safety and handling of fishing lure 11 and reducing the likelihood of snagging fishing lure 11 on underwater foliage or debris. Having a separate spring enables the energy storing portion of the assembly to be of resilient spring steel, while the hook is made of conventional, non resilient steel. The hooks do not bend when moved between the released and cocked positions. The offset foot of each spring energizing leg keeps the shanks of the hooks in parallel alignment with the energizing legs, avoiding bending of the shanks of the hooks.

While the invention has been shown in only some of its forms, it should be apparent to those skilled in the art that it is not so limited, but susceptible to various changes without departing from the scope of the invention. For example, hooks 25 can be arranged to extend through oppositely located elongated slots 23 so that hooks extend from both sides of fishing lure 11, in a v-like manner, rather than through the same side of fishing lure 11.

The invention claimed is:

1. A fishing lure, comprising:
 a lure body having a longitudinal axis, a central cavity, a trigger opening extending from the cavity on a forward end of the lure body, and a hook slot extending from the cavity on a side of the lure body;
 a hook having a barb and a shank, the hook being rotatable from a released position wherein the barb protrudes from the body to a cocked position wherein the barb is recessed within the cavity, the hook being biased toward the released position;
 a trigger carried in the cavity for forward and rearward linear movement along the longitudinal axis, the trigger having a trigger body with a rod on a forward end of the trigger body that extends through the trigger opening for attachment to a line, the trigger body engaging a forward side of the shank to rotate the hook to the cocked position when the rod is manually pushed rearwardly;
 a lure body detent in the cavity, the lure body detent having a lure body detent surface that slopes away from the axis in the rearward direction;
 a trigger body detent surface on the trigger body spaced from a rearward end of the trigger body and separated from the rearward end of the trigger body by a ramp surface that has a length greater than a length of the trigger body detent surface, the ramp surface sloping toward the axis in the rearward direction, the trigger body detent surface sloping away from the axis in the rearward direction; and wherein
 pushing the rod rearward causes the ramp surface to slide on at least part of the lure body detent and the trigger body detent surface to releasably engage the lure body detent surface to retain the hook in the cocked position, and a forward pull on the rod releases the trigger body detent surface from the lure body detent surface, freeing the hook to rotate to the released position.

2. The lure according to claim 1, wherein the ramp surface contains an impregnated lubricant.

3. The lure according to claim 1, wherein the ramp surface is flat and slopes at a lesser angle relative to the axis than the trigger body detent surface.

4. The lure according to claim 1, further comprising:
 a flat shank engagement surface in sliding contact with the shank and located at the rearward end of the trigger body, the shank engagement surface sloping toward the slot in a rearward direction so as to be substantially flush with the shank of the hook while the hook is in the released position.

5. A fishing lure, comprising:
 a lure body having a longitudinal axis, a central cavity, a trigger opening extending from the cavity on a forward end of the lure body, and a hook slot extending from the cavity on a side of the lure body;
 a pin extending through the cavity perpendicular to the axis;
 a spring having a coiled portion fixedly mounted around the pin, an energizing leg extending from the coiled portion, and a foot extending laterally from the energizing leg, the foot terminating in a free end that is unattached to any other components of the lure;
 a hook having a curved portion with a barb on one end of the hook, a shank joining the curved portion, and a mounting loop on an opposite end of the hook opposite the curved portion, the mounting loop extending around the pin adjacent the coiled portion of the spring, the foot of the spring engaging a rearward side of the shank between the curved portion and the mounting loop, the hook being movable between a recessed position with the barb recessed within the slot to an exposed position with the barb protruding exterior of the lure body;

a trigger carried in the cavity, the trigger having a trigger body with a rod on a forward end of the trigger body that extends through the trigger opening for attachment to a line, the trigger body engaging a forward side of the shank;

the trigger being movable rearwardly to a cocked position wherein the trigger body pushes against the shank to rotate the hook to the recessed position, the trigger body and the lure body having mating detent surfaces to releasably retain the hook in the recessed position, such that a forward pull on the rod releases the trigger to move forward, freeing the coiled portion of the spring to unwind, causing the energizing leg to rotate the hook to the exposed position;

wherein:

the energizing leg extends from the coiled portion of the spring along an energizing leg tangent line; and the portion of the foot that contacts the shank is on a foot tangent line emanating from the coiled portion, the foot tangent line being at an angle relative to the energizing leg tangent line by an amount that causes a portion of the shank of the hook and the energizing leg to be parallel with each other.

6. The lure according to claim 5, further comprising:

a ballast weight carried within the body offset from the longitudinal axis.

7. The lure according to claim 5, wherein both the energizing leg and the portion of the shank of the hook are in contact with the trigger body while the trigger is in the cocked position.

8. The lure according to claim 5, wherein a portion of the trigger body contains an impregnated lubricant to facilitate the detent surface of the trigger body sliding past the detent surface of the lure body while the trigger is moved rearward.

9. A fishing lure, comprising:

a lure body having a longitudinal axis, a central cavity, a trigger opening extending from the cavity on a forward end of the lure body, and a hook slot extending from the cavity on a side of the lure body;

a pin extending through the cavity perpendicular to the axis;

a spring having a coiled portion fixedly mounted around the pin, an energizing leg extending from the coiled portion, and a foot extending laterally from the energizing leg, the foot terminating in a free end that is unattached to any other components of the lure;

a hook having a curved portion with a barb on one end of the hook, a shank joining the curved portion, and a mounting loop on an opposite end of the hook opposite the curved portion, the mounting loop extending around the pin adjacent the coiled portion of the spring, the foot of the spring engaging a rearward side of the shank between the curved portion and the mounting loop, the hook being movable between a recessed position with the barb recessed within the slot to an exposed position with the barb protruding exterior of the lure body;

a trigger carried in the cavity, the trigger having a trigger body with a rod on a forward end of the trigger body that extends through the trigger opening for attachment to a line, the trigger body engaging a forward side of the shank;

the trigger being movable rearwardly to a cocked position wherein the trigger body pushes against the shank to rotate the hook to the recessed position, the trigger body and the lure body having mating detent surfaces to releasably retain the hook in the recessed position, such that a forward pull on the rod releases the trigger to move forward, freeing the coiled portion of the spring to unwind, causing the energizing leg to rotate the hook to the exposed position;

wherein:

the detent surface of the lure body slopes toward the slot in a rearward direction;

the detent surface of the trigger body slopes toward the slot in the rearward direction and is spaced forward from a rearward end of the trigger body; and wherein the trigger body has a ramp surface between the rearward end of the trigger body and the detent surface of the trigger body that slopes away from the slot in the rearward direction and slidingly engages a portion of the detent surface of the lure body when the trigger is being moved rearward toward the cocked position, the ramp surface having a length greater than a length of the detent surface of the trigger body.

10. The lure according to claim 9, wherein the mounting loop of the hook rotates relative to the pin while the hook moves between the recessed and exposed positions.

11. The lure according to claim 9, wherein the spring has a stationary portion extending from the coiled portion and engaging a portion of the lure body to prevent rotation of the coiled portion relative to the pin.

12. The lure according to claim 9, wherein the trigger body has a shank engagement surface that engages the shank of the hook, the shank engagement surface sloping toward the slot in a rearward direction.

13. A fishing lure, comprising:

a lure body having a longitudinal axis, a central cavity, a trigger opening extending from the cavity on a forward end of the lure body, and at least one hook slot extending from the cavity on a side of the lure body;

a pin extending through the cavity perpendicular to the axis;

a spring having a coiled portion fixedly mounted around the pin, a pair of energizing legs extending on a tangent line from the coiled portion, and a foot extending laterally from each of the energizing legs, each foot having an end, the ends of the feet facing in opposite directions from each other and being spaced apart from each other;

a pair of side-by-side hooks, each hook having a curved portion with a barb on one end of each hook, a shank joining the curved portion, and a mounting loop on an opposite end of each hook opposite the curved portion, the mounting loops extending around the pin on opposite sides of the coiled portion of the spring and being rotatable relative to the pin, each of the hooks being rotatable about the pin between a cocked position with each barb recessed within the at least one hook slot to an exposed position with each barb protruding exterior of the lure body, and wherein each of the feet of the spring engages a rearward side of the shank of one of the hooks to urge the hooks toward the exposed position;

a trigger carried in the cavity for sliding movement along the axis between a rearward position and a forward position, the trigger having a trigger body with a forward end and a rearward end, a rod extending forward from the forward end of the trigger body through the trigger opening for attachment to a line, the trigger body engaging a forward side of each of the shanks and each of the energizing legs to force the hooks to the cocked position when the trigger body is manually pushed to the rearward position;

mating detent surfaces on the trigger body and the lure body to releasably retain the trigger in the rearward position, so that a forward pull on the rod while the trigger body is in the rearward position disengages the mating detent surfaces from each other, freeing the coiled portion of the spring to unwind, causing the energizing legs to rotate the hooks to the exposed position; and a shank engagement surface on the rearward end of the trigger body that slopes away from the axis in a rearward direction at an angle selected so as to be substantially flush with the shanks of the hooks while the hooks are in the exposed position.

14. A fishing lure, comprising:

a lure body having a longitudinal axis, a central cavity, a trigger opening extending from the cavity on a forward end of the lure body, and at least one hook slot extending from the cavity on a side of the lure body;

a pin extending through the cavity perpendicular to the axis;

a spring having a coiled portion fixedly mounted around the pin, a pair of energizing legs extending on a tangent line from the coiled portion, and a foot extending laterally from each of the energizing legs, each foot having an end, the ends of the feet facing in opposite directions from each other and being spaced apart from each other;

a pair of side-by-side hooks, each hook having a curved portion with a barb on one end of each hook, a shank joining the curved portion, and a mounting loop on an opposite end of each hook opposite the curved portion, the mounting loops extending around the pin on opposite sides of the coiled portion of the spring and being rotatable relative to the pin, each of the hooks being rotatable about the pin between a cocked position with each barb recessed within the at least one hook slot to an exposed position with each barb protruding exterior of the lure body, and wherein each of the feet of the spring engages a rearward side of the shank of one of the hooks to urge the hooks toward the exposed position;

a trigger carried in the cavity for sliding movement along the axis between a rearward position and a forward position, the trigger having a trigger body with a forward end and a rearward end, a rod extending forward from the forward end of the trigger body through the trigger opening for attachment to a line, the trigger body engaging a forward side of each of the shanks and each of the energizing legs to force the hooks to the cocked position when the trigger body is manually pushed to the rearward position;

mating detent surfaces on the trigger body and the lure body to releasably retain the trigger in the rearward position, so that a forward pull on the rod while the trigger body is in the rearward position disengages the mating detent surfaces from each other, freeing the coiled portion of the spring to unwind, causing the energizing legs to rotate the hooks to the exposed position; and wherein the spring has a central loop extending from the coiled portion between the energizing legs, the central loop engaging a portion of the lure body to prevent rotation of the coiled portion relative to the pin.

15. The lure according to claim 14, wherein:

the detent surface of the lure body slopes away from the axis in a rearward direction;

the detent surface of the trigger body slopes away from the axis in the rearward direction and is spaced forward from the rearward end of the trigger body; and wherein the trigger body has a ramp surface between the rearward end of the trigger body and the detent surface of the trigger body that slopes toward the axis in the rearward direction and slidingly engages a portion of the detent surface of the lure body when the trigger is being moved rearward toward the rearward position, the ramp surface being a flat surface having a length greater than a length of the detent surface of the trigger body.

16. The lure according to claim 14, wherein:

the foot of each energizing leg is offset from the respective energizing leg, so that the shanks will be parallel with each other and with the energizing legs while in the cocked position.

17. The lure according to claim 14, further comprising:

a ballast weight carried within the body offset from the longitudinal axis.

\* \* \* \* \*